United States Patent [19]

Sellakumar

[11] Patent Number: 5,242,472
[45] Date of Patent: Sep. 7, 1993

[54] FLOW RESTRICTOR IN A PULSE CLEANING SYSTEM

[75] Inventor: Karukkampalayam M. Sellakumar, San Diego, Calif.

[73] Assignee: A. Ahlstrom Corporation, Noormarkku, Finland

[21] Appl. No.: 569,125

[22] Filed: Aug. 17, 1990

[51] Int. Cl.[5] ............................................. B01D 46/04
[52] U.S. Cl. ....................................... 96/280; 55/302
[58] Field of Search .................................. 96/302, 280

[56] References Cited

U.S. PATENT DOCUMENTS

| | | | |
|---|---|---|---|
| 3,630,005 | 12/1971 | Reinauer | 55/96 |
| 4,067,704 | 1/1978 | Zenz | 55/99 |
| 4,161,389 | 7/1979 | Staffin et al. | 432/58 |
| 4,343,631 | 8/1982 | Ciliberti | 55/302 |
| 4,468,240 | 8/1984 | Margraf | 55/290 |
| 4,584,003 | 4/1986 | Oda et al. | 55/269 |
| 4,692,173 | 9/1987 | Roos | 55/96 |
| 4,735,638 | 4/1988 | Ciliberti et al. | 55/302 |
| 4,764,190 | 8/1988 | Israelson et al. | 55/269 |
| 4,867,769 | 9/1989 | Oda et al. | 55/302 |
| 4,869,207 | 9/1989 | Engstrom et al. | 122/4 |

FOREIGN PATENT DOCUMENTS 29534 7/1985 Japan ..................................... 55/302
507337 8/1976 U.S.S.R. ................................. 55/96

Primary Examiner—Bernard Nozick
Attorney, Agent, or Firm—Nixon & Vanderhye

[57] ABSTRACT

Particulate material is separated from high temperature gas using a number of elongated porous walled tubular filter elements. The dirty sides of the filter elements are operatively connected to a dirty gas inlet to an upright vessel, while the clean side of the filter element is in operative association with a clean gas outlet. A separated particle outlet extends from the bottom of the vessel. Cleaning of the filter elements takes place by a pulse of high pressure cleansing gas which is supplied to the clean side of the filters. In order to prevent thermal shock or mechanical damage to the filters, especially since the cleansing gas is of a lower temperature than the gas being filtered, the volume of cleansing gas is positively controlled. This is accomplished by placing a restrictor (e.g. orifice or nozzle) between the high pressure source of cleansing gas and a reservoir having a volume sufficient to effect cleansing, but insufficient to cause thermal shock. A conduit, with a quick acting valve in the conduit, extends from the reservoir to the clean side of the filter elements. Even if the valve sticks open, there is insufficient volume and/or flow rate of cleansing gas to cause thermal shock to the filters.

22 Claims, 4 Drawing Sheets

FLOW RESTRICTOR IN A PULSE CLEANING SYSTEM

BACKGROUND AND SUMMARY OF THE INVENTION

There are many circumstances in which it is necessary to effectively operate an apparatus for a process for separating particulate material from a high temperature gas. For example in circulating fluidized bed combustion or gasification processes, large amounts of dust (which may include solid bed material, ashes, unburned fuel, reactive absorbents, etc.) are continuously entrained with the exhausted high temperature gases from the combustion chamber. In some cases, the dust is recirculated back into the combustion chamber after the particles have been separated. In this, and many other embodiments, gas permeable high temperature filters may be utilized. Such filters typically are a plurality of elongated parallel tubes of porous super alloys or ceramics or combinations thereof that can endure high temperature conditions and do not need to be protected by cooling surfaces or refractory linings. However when such filters are utilized, dust gradually accumulates on the surfaces of the porous material and the filter has to be periodically cleaned.

Cleaning of such filters cannot be done by shaking, vibrating, or even brushing or scraping, since such filters may be very fragile and consequently easily damaged by rough treatment. Therefore, typically such porous filter tubes are cleaned by a high pressure backflushing pulse of cleansing gas. For example U.S. Pat. No. 4,161,389, and co-pending application Ser. No. 07/378,628 filed Jul. 12, 1989, teach the utilization of backflushing pulses of cleansing gas to clean elongated porous filter elements.

In a typical system for supplying a pulse of cleansing gas to the filter elements, a quick acting valve is disposed between a source of cleansing gas under high pressure, and the clean side of the filters, operation of the valve by a solenoid or the like causing a pulse of gas to pass from the high pressure source through the porous filter elements. Since only a pulse of gas is provided, there is typically no adverse thermal shock to the fragile filter elements at high temperature (the cleansing gas is necessarily at significantly lower temperatures than the gas from which the particulates are being separated), and does not interfere with the normal passage of the "dirty" gas into operative association with the filter elements, the backflushing action taking a very small period of time. Unfortunately, however, quick acting valves are delicate structures, and can malfunction for many different reasons. If they do malfunction, a large volume of gas can pass from the source into contact with the filter elements—rather than merely the designed "pulse" of gas sufficient only to effect dislodgement of collected particles on the filtering element walls, without thermal shock. If such a large volume of gas passes from the high pressure but at a low temperature source of cleansing gas through the filter elements, that can cause thermal shock, and thereby breakage or leakage of the filter elements, and additionally it interferes with the filtering process, and causes one to shut down the entire process—which may include a circulating bed reactor in association with the filtering elements.

According to the present invention, the above described problems have been remedied by positively controlling the volume of gas supplied to the filter elements. Positive control is accomplished by providing a reservoir of cleansing gas having a volume sufficient to effect particle dislodgement from the filtering elements, but insufficient to cause thermal shock or major interruption of the filtering process, with a flow rate restrictor disposed between the source and the reservoir. The restrictor allows only a small flow rate of gas therethrough, so that the volume of the reservoir fills up between the periodic actuations of the quick acting valve, but so that the flow rate is insufficient to cause thermal shock to the filtering elements. Of course the exact size of the restrictor opening will depend upon the temperatures and flow rates of the gases, the particular materials of the filter elements, the volumes of the reservoirs, etc. The restrictor typically comprises an orifice or a nozzle having a diameter measured most effectively in millimeters, although—again—the dimensions will vary widely depending upon the particular operational and equipment parameters.

According to one aspect of the present invention, an apparatus is provided comprising: (a) A vessel having a dirty gas inlet, a separated particulate material outlet, and a clean gas outlet. (b) A plurality of filter elements having filter pores therein which allow the passage of the high temperature gas therethrough, but filter out the majority of the particulates contained in the gas, the dirty gas inlet being provided on one side of the filter elements, and the clean gas outlet being provided on the other side of the filter elements. And, (c) means for supplying a positively controlled volume, high speed, cleansing gas pulse to the filter elements to effect removal of particles which might collect thereon.

The means (c) preferably comprises the following elements: A source of high pressure cleansing gas. A reservoir of high pressure cleansing gas operatively connected to the source by a gas flow rate restrictor means. A conduit connected between the reservoir and the clean side of the filter elements. And, a quick acting valve disposed in the conduit.

As earlier described, the filter elements preferably are elongated tubular elements, which can be open throughout the entire middle portion thereof to the dirty gas flow, or can have one closed end and be opened to the exterior opposite to the closed end thereof to the dirty gas flow. If desired, the clean side of the filters may be divided into a plurality of different chambers, with one reservoir, and a restrictor associated with each chamber. Also, a number of different reservoirs and restrictors can be associated with the same chamber or the entire clean side of the filter, and the appropriate reservoir will be selected depending upon temperature and flow conditions, or the like.

The apparatus according to the invention—in one exemplary particularly worthwhile utilization thereof—is utilized in a circulating fluidized bed reactor having a downstream filter housing and reactor chamber arranged back-to-back one with the other, such as disclosed in U.S. Pat. No. 4,869,207, the disclosure of which is hereby incorporated by reference herein.

According to another aspect of the present invention, a method for removing particulate material from high temperature gas is provided. The method comprises the steps of: (a) Feeding dirty gas into contact with the dirty side of the filter element. (b) Withdrawing clean gas from the clean side of the filter element. (c) Periodically supplying a high pressure pulse of cleansing gas to the clean side of the filter elements to dislodge particles which have adhered to the dirty side of the filter elements, the cleansing gas having a lower temperature than the high temperature gas from which particulates are being separated. And, (d) positively controlling the volume of the cleansing gas pulse in step (c) to minimize thermal stock to the filtering elements and to minimize interruption of the filtering action effected when previously dirty gas passes through the filtering elements. Step (d) is preferably accomplished by: Providing a high pressure source of cleansing gas. Providing a reservoir of a controlled volume, for the cleansing gas. And, restricting the passage of cleansing gas between the source and the reservoir so that the flow rate of gas is insufficient to cause thermal shock.

Steps (c) and (d) are preferably practiced by placing the reservoir in operative communication with the clean side of the filter elements to effect cleansing action. Step (c) is also preferably practiced by supplying cleansing gas at approximately sonic velocity.

It is the primary object of the present invention to provide for the effective and non-destructive cleansing of filter elements during the separation of particulates from high temperature gas. This and other objects of the invention will become clear from an inspection of the detailed description of the invention, and from the appended claims.

DETAILED DESCRIPTION OF THE DRAWINGS

Figure 1:
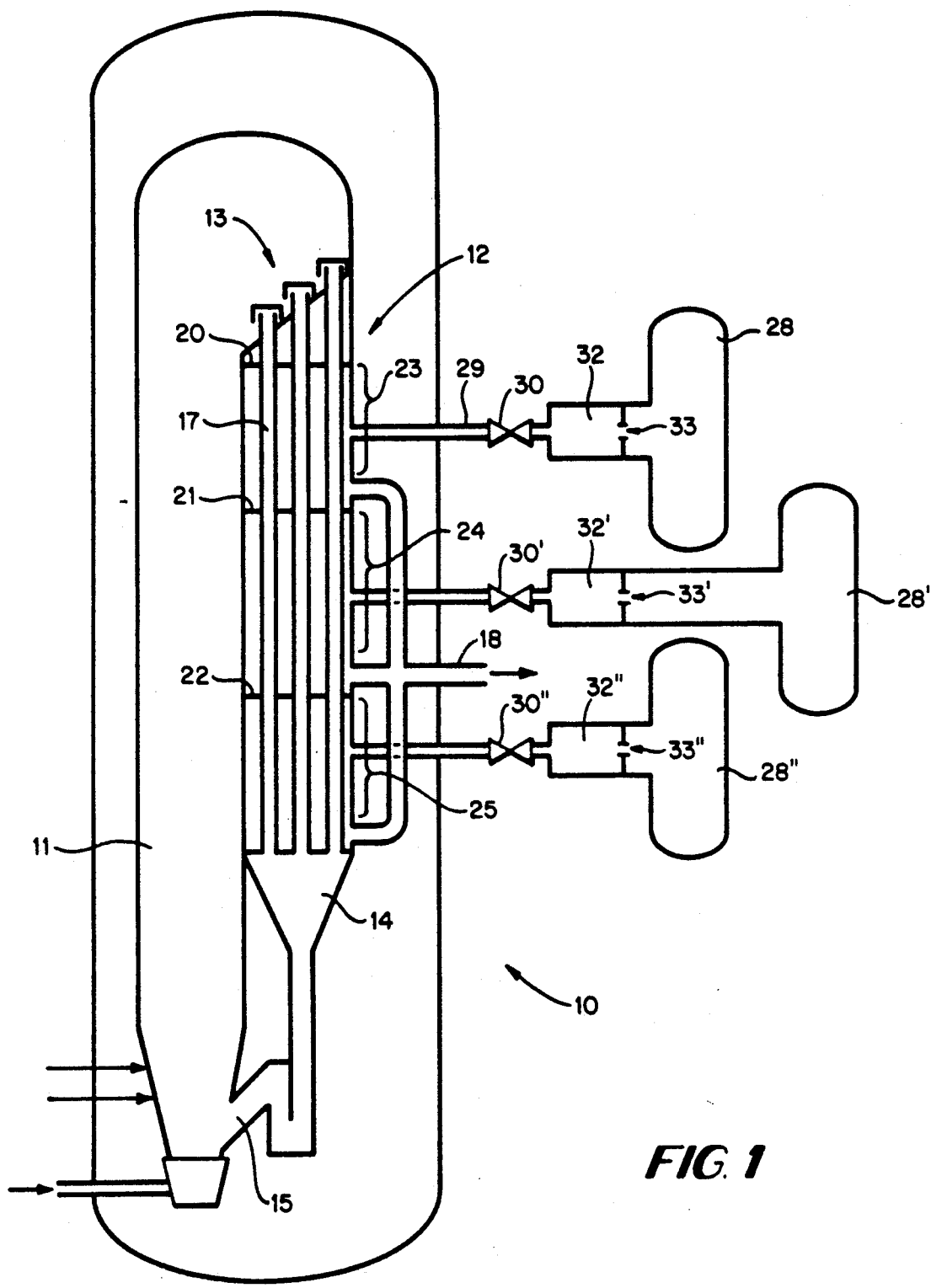
FIG. 1 is a schematic vertical cross-sectional view of a circulating fluidized bed reactor constructed in accordance with the present invention, utilizing a controlled volume flow of cleansing gas to the filter elements.

Illustrated generally by reference number 10 in FIG. 1 is a reactor like that shown in U.S. Pat. No. 4,869,207 (the disclosure of which is hereby incorporated by reference herein) except that it also includes the structure according to the invention. The reactor 10 includes a circulating fluidized bed reactor 11 and a filter housing 12, which are arranged in back-to-back relationship with each other. The filter housing 12 includes an inlet 13 for high temperature dirty gas with particulates therein, the gas being the exhaust gas from the fluidized bed reactor 11. The particulate outlet 14 from the filter housing 12 returns separated particles—via duct 15—to the bottom of the fluidized bed reactor 11. The filters in the filter housing 12 preferably comprise a plurality of vertical, parallel, hollow tubular filter elements which are porous and open at both ends thereof. The material of which the filter elements 17 is made may comprise a ceramic material or super alloys or a combination thereof, the filter tubes 17 themselves being per se well known. A clean gas outlet 18 is provided from the filter housing 12, the interior of the tubes 17 being the "dirty" sides of the filter elements, while the clean gas outlet 18 cooperates with the "clean" exteriors of the tubes 17.

In the particular embodiment illustrated in FIG. 1, because of the long length of the tubes 17, it is desired to divide up the clean side of the tubes with divider walls 20, 21, 22. The walls 20, 21, 22—along with the bottom support for the tubes 17 (at the top of the particulate outlet 14)—define a plurality of horizontal clean gas chambers 23, 24, 25, each having a conduit extending therefrom to the clean gas outlet 18.

After operation of the reactor 10 for some period of time, particles have a tendency to collect on the interior, dirty, surface of the tubes 17, hampering the efficiency of the filter and the possible throughput. In order to clean these particulates from the dirty side of the filter, a high pressure pulse of clean air from a source 28, 28', 28" is supplied to each of the clean chambers 23-25. The air passes backwardly through the porous walls of the tubes 17 and dislodges particulates from the dirty side of the tubes 17. Of course the backflushing gas has a significantly lower temperature than the high temperature gas that is being filtered by the filter housing 12, therefore if the volume of backflushed gas used is too large, thermal shock—and subsequent cracking and other damage to the filter elements 17—can occur.

As is conventional, the source 28 of high pressure cleansing gas is connected to a conduit 29, which has a quick acting valve (typically a solenoid actuated valve) 30 therein. A cleaning pulse is provided by quickly opening and then closing the valve 30, which allows a stream of high pressure cleansing gas (typically at sonic velocity) to pass backwardly through the filter elements 17. In accordance with the present invention, the volume of that cleansing gas is positively controlled to ensure that it will not be so large as to damage the filter elements 17 and/or interfere with the operation of the filter housing 12.

To guard against the situation where the valve 30 operates improperly, sticks in the open position, or simply is too slow in closing, a reservoir 32 is provided. The reservoir has sufficient volume of cleansing gas to provide the desired pulse cleaning of the elements 17 and horizontal chamber 23. However the volume of gas in the reservoir 32 is insufficient to cause thermal shock or mechanical damage to the filter elements 17, or significantly interfere with the filtering operation. This positive control is effected by providing the restrictor means 33 between the source 28 and the reservoir 32. The restrictor means 33—which may comprise any suitable restrictor such as a conventional knife edge orifice having a very small diameter, or a nozzle—is large enough to allow the reservoir 32 to be filled with high pressure cleansing gas from source 28 during the period of time that the quick acting valve 30 is normally closed, but is insufficient in size to allow large enough flow rates of cleansing gas to cause thermal shock or mechanical damage to the elements 17 and/or significantly interfere with operation of the filter to pass therethrough. Of course—as illustrated in FIG. 1—each of the sources 28', 28" also has a reservoir 32', 32" and a restrictor means 33', 33" associated therewith.

Figure 2:
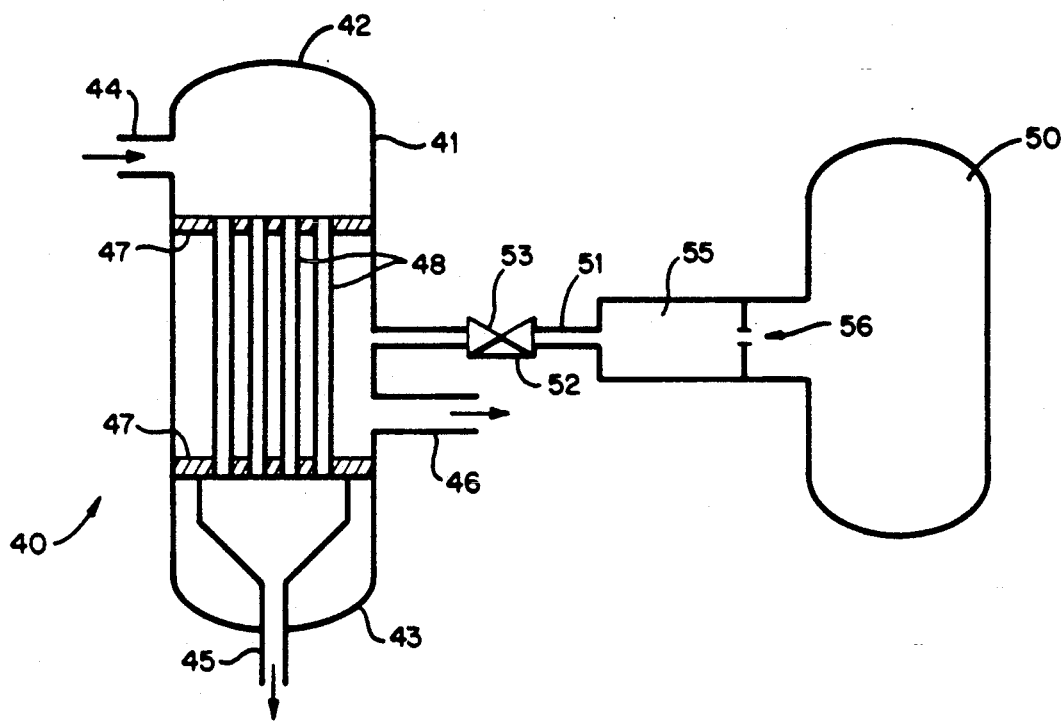
FIG. 2 is a vertical cross-sectional schematic view of an exemplary embodiment of the apparatus according to the present invention disassociated from a fluidized bed reactor.

FIG. 2 is an illustration of an apparatus according to the present invention that is detached from a circulating fluidized bed reactor, or other source of the high temperature gas, but may be placed outside the pressure vessel containing the reactor. In this embodiment, an upright, vertical, treatment vessel 40 is provided, having a continuous side wall 41, a top 42, and a bottom 43. High temperature "dirty" gas—that carries particulate material to be separated—is fed into the vessel 40, through the side wall 41 near the top 42, via dirty gas inlet 44. Separated particulates are withdrawn through the bottom 43 via particulate discharge conduit 45. Clean gas—from the "clean" sides of the filtering elements of the apparatus 40—is removed through the side wall 41, at a location thereof, via clean gas outlet 46. In this particulate embodiment horizontally extending mounting plates 47 mount a plurality of elongated hollow tubular open ended filter elements 48, of a porous material such as a ceramic, or a super alloy, or combination thereof.

To effect periodic cleansing of the filter elements 48, the source 50 of high pressure cleansing gas is provided, as well as a conduit 51 with a quick acting valve 52 therein, the valve 52 typically being operated by solenoid 53. The gas supplied for cleansing through the conduit 51 is at high speed, e.g. at approximately sonic velocity. All that has been heretofore described with respect to the apparatus 40 is known. However, according to the invention, means for positively controlling and limiting the amount of high speed cleansing gas pulse that is provided to the filtering elements 48 is utilized. Such means comprises the reservoir 55 and the restrictor means 56, comparable to the reservoir 32 and restrictor means 33 of the FIG. 1 embodiment.

Figure 3:
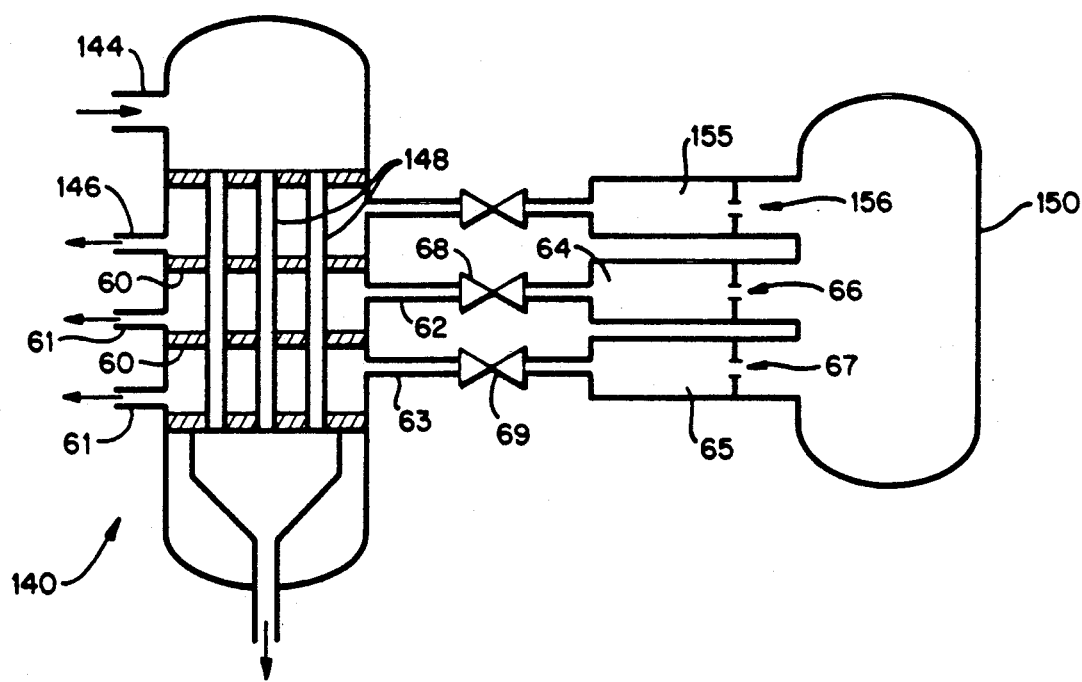
FIG. 3 is a view like that of FIG. 2 only for a second embodiment.

In the FIG. 3 embodiment, structures comparable to those in the FIG. 2 embodiment are shown by the same reference numeral only preceded by a "1". The major difference between this embodiment and that of FIG. 2 is the presence of the horizontal walls 60 which define the clean gas side of the filter elements 148 into three different horizontal chambers, with a clean gas outlet 146, 61 from each of these chambers. A conduit (62, 63) valve (68, 69), reservoir (64, 65), and restrictor means 66, 67 is associated with each of the two lower gas cleansing units, just as it is with the upper reservoir 155. A common source of high pressure, high speed cleansing gas is provided by reservoir 150.

Figure 4:
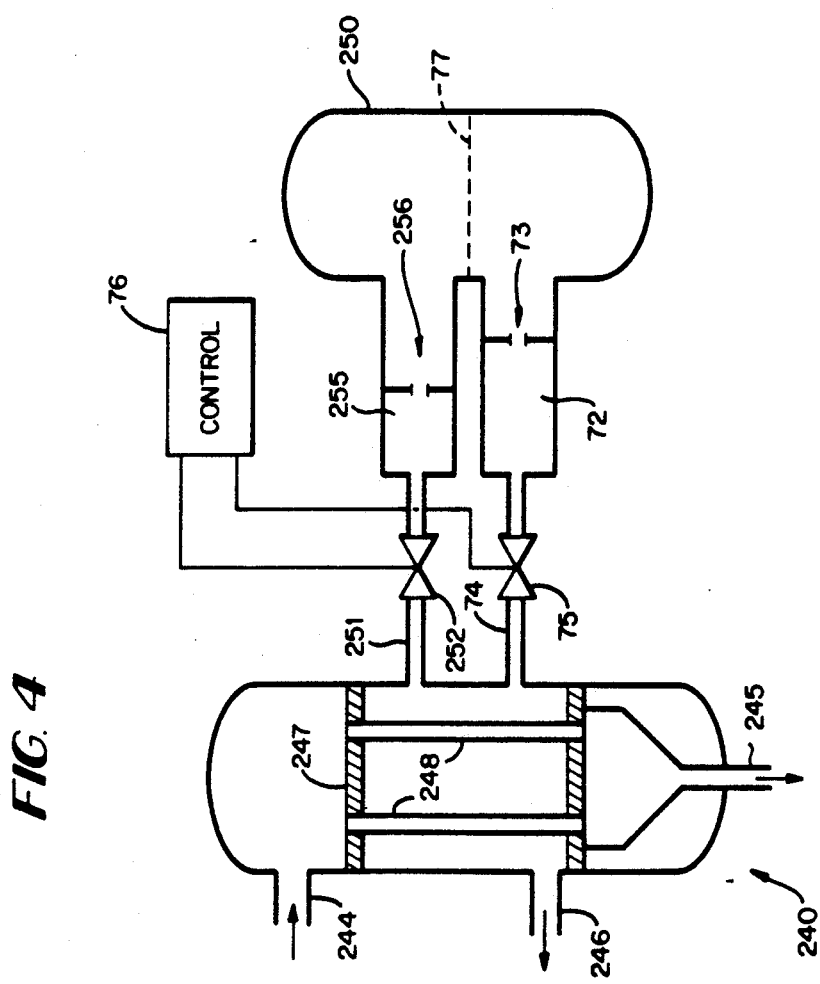
FIG. 4 is a view like that of FIG. 2 only for a third embodiment.

In the FIG. 4 embodiment, structures comparable to those in the FIG. 2 embodiment are illustrated by the same reference numeral only preceded by a "2". In this embodiment, the major distinction over that in the FIG. 2 embodiment is the fact that there are two different volume reservoirs 255, 72, associated with a common clean side of the filter elements 248. The high pressure gas either can be supplied from a large volume reservoir 72 (which is separated from source 250 by restrictor 73) through conduit 74 as controlled by quick acting valve 75, or from small volume reservoir 255. The control 76 is provided which determines which of the valves 252, 75 will be actuated for a particular cleansing action. The selection may turn upon the particular operating conditions of the vessel 240 (e.g. the characteristics of the high temperature gas through dirty gas inlet 244), or other parameters.

Also—as illustrated in FIG. 4 by dotted line at 77—under some circumstances one may provide two different sources feeding the reservoirs 72, 255. One source on one side of wall 77 may be at a different pressure than the source on the other side of wall 77, and which reservoir 72, 255 was utilized for any particular cleansing operation could depend upon the time between cleanings, the characteristics of the dirty gas, etc.

Figure 5:
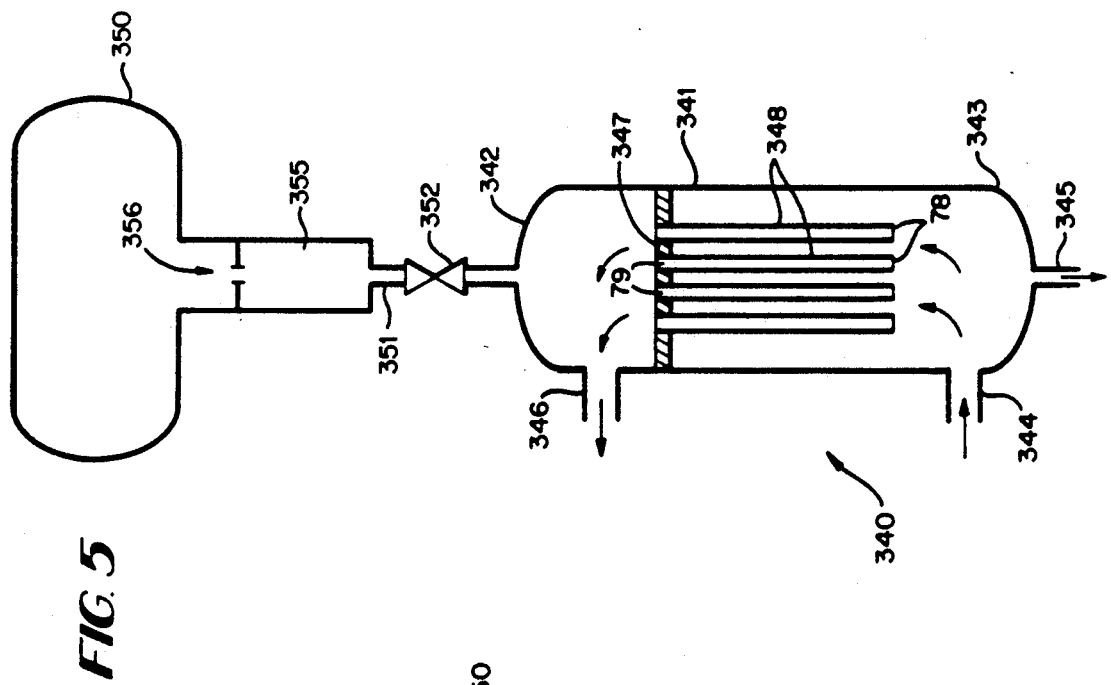
FIG. 5 is a view like that of FIG. 2 only for a fourth embodiment.

In the FIG. 5 embodiment, structures comparable in function to those in the FIG. 2 embodiment are illustrated by the same reference numeral only preceded by a "3". The major distinctions of this embodiment are that the dirty gas does not flow through the tubular filter elements 348, but rather merely flows around the exterior thereof. This is due to the fact that the filter elements 348 have the bottoms thereof closed off by a solid or porous end wall 78. They are still open at the top, as indicated by opening 79, however. In this embodiment, the dirty gas inlet 344 is near the bottom, in the side wall, of the vessel 340, while the clean air outlet is near the top, in the side wall, as indicated at 346. Thus clean gas is in the interior of the filters 348 and the dirty gas is exteriorly thereof. Also, the cleansing gas from high pressure source 350 passes through the top 342 of the housing 341, and thus will flow initially through the interior of the elements 348, along their direction of elongation, before flowing outwardly radially through the porous walls thereof during cleansing action thereby.

Figure 6:
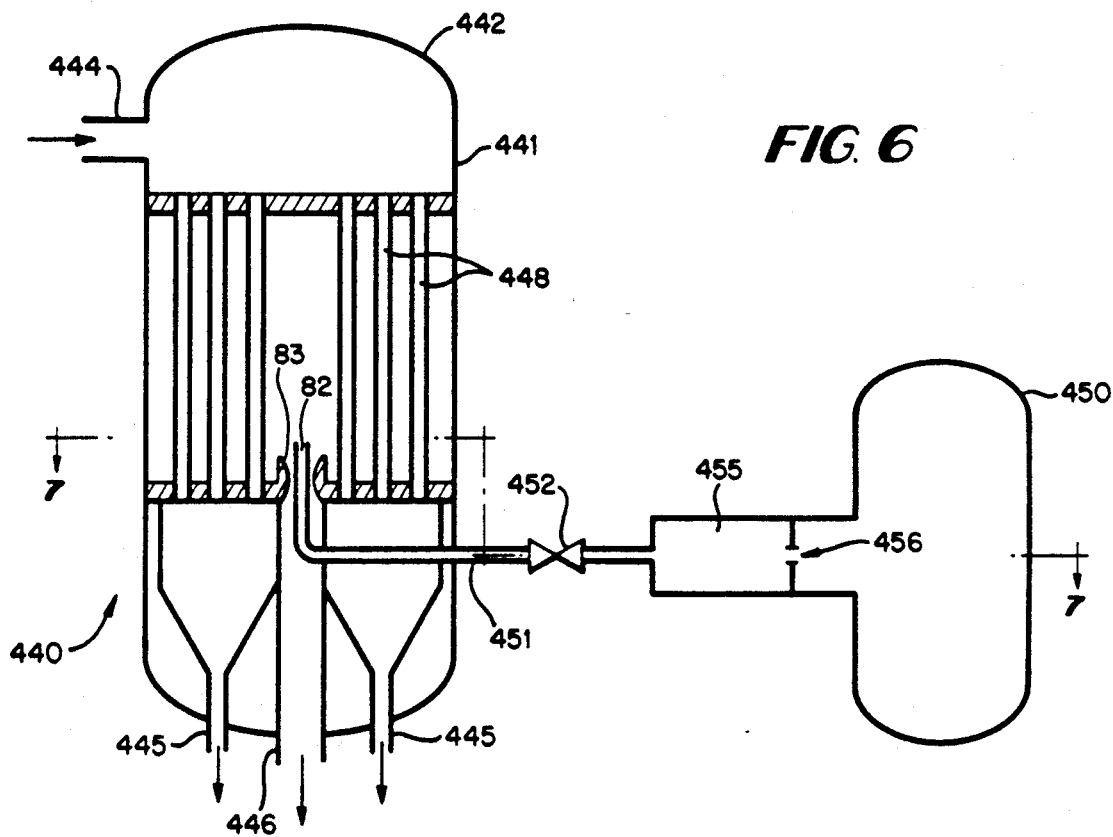
FIG. 6 is a view like that of FIG. 2 only for a fifth embodiment.
Figure 7:
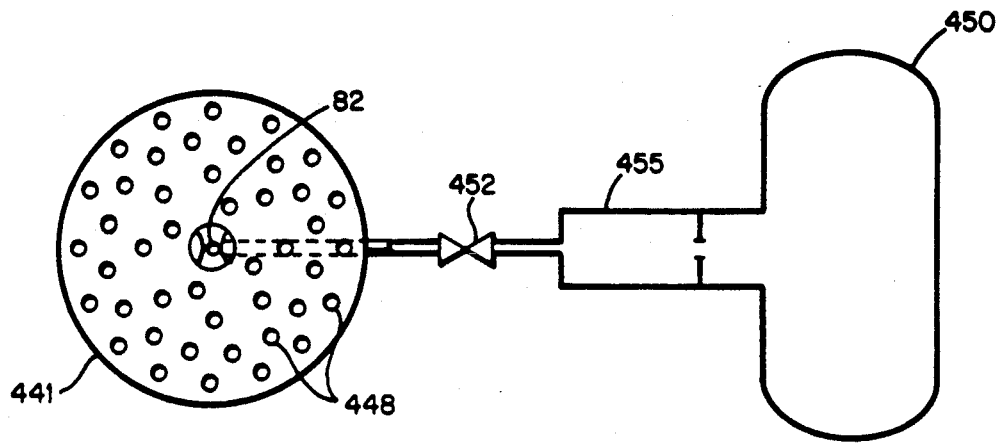
FIG. 7 is a top horizontal cross-sectional schematic view of the apparatus of FIG. 6, the cross-section taken along lines 7—7 thereof.

In the embodiment illustrated in FIGS. 6 and 7, structures comparable to those in the FIG. 2 embodiment are illustrated by the same reference numeral only preceded by a "4". In this embodiment, the construction of the vessel 440 and the inlet 451 for the cleansing gas, are identical to those in co-pending application Ser. No. 07/378,628 filed Jul. 12, 1989, the disclosure of which is hereby incorporated by reference herein. Note that the main distinctions of this embodiment over the FIG. 2 embodiment are the utilization of two or more separate particle outlets 445, the central clean gas outlet 446, and the location of a termination end 82 of the conduit 451 within a venturi 83 in the clean gas outlet conduit 448.

Operation

Utilizing the structure according to the present invention, the following method may be practiced (with respect to the FIG. 2 embodiment): (a) Feeding dirty gas (through 44) into contact with the dirty side of the filter from the clean side of the filter element. (c) Periodically supplying a high pressure pulse of cleansing gas (from source 50) to the clean side of the filter elements to dislodge particles which have adhered to the dirty side of the filter elements 48, the cleansing gas having a lower temperature than the high temperature gas from which particulates are being separated. And, (d) positively controlling (via 55, 56) the volume and flow rate of the cleansing gas pulse in step (c) to minimize thermal shock or mechanical damage to the filtering elements and to minimize interruption of the filtering action effected when previously dirty gas passes through the filtering elements. Step (d) is preferably practiced by: Providing a high pressure source (50) of cleansing gas. Providing a reservoir (55) of a controlled volume, for the cleansing gas. And restricting the passage (via orifice 56 or a nozzle) of cleansing gas between the source and the reservoir. Steps (c) and (d) are practiced by placing the reservoir (55) in operative communication with the clean side of the filter elements (48) to effect cleansing action. The velocity of the cleansing gas applied is typically approximately sonic velocity.

Utilizing the apparatus and method according to the present invention, should the quick acting valve 52 ever operate too slowly, or stick in the open position, thermal shock to the filter elements 48 will not occur, and- /or the interference with the normal filtering operation will be minimized, due to the fact that only the controlled volume of high pressure, high speed, pulse of cleansing air will be provided by the reservoir 55. The restrictor 56 controls the flow rate of gas so that even with the valve stuck open the volume and flow rate of gas impacting filter elements 48 is insufficient to cause thermal shock. Once the valve 52 does close in a normal operation, gas from source 50 will leak through restrictor 56 into reservoir 55, ultimately filling the reservoir 55 so that it is again full and ready for another operation. A pulsed high pressure flow will be effective only until the pressure in the reservoir is nearly twice the filter clean gas side pressure.

While the invention has been herein shown and described in what is presently conceived to be the most practical and preferred embodiment thereof, many modifications may be made thereof within the scope of the invention, which scope is to be accorded the broadest interpretation of the appended claims so as to encompass all equivalent systems and procedures.

What is claimed is:

1. Apparatus for separating particulate material from a high temperature gas containing the particulate material, comprising:
   (a) a vessel having a dirty gas inlet, a separated particulate material outlet, and a clean gas outlet;
   (b) a plurality of filter elements having filter pores therein which allow the passage of the high temperature gas therethrough, but filter out the majority of the particulates contained in the gas, the dirty gas inlet being provided on one side of said filter elements, and the clean gas outlet being provided on the other side of said filter elements;
   (c) means for supplying a positively controlled volume, high speed, cleansing gas pulse to said filter elements to effect removal of particles which might collect thereon; and
   wherein said means (c) comprises: a source of high pressure cleansing gas; a reservoir of high pressure cleansing gas operatively connected to said source by a flow rate restrictor means; a conduit connected between said reservoir and the clean side of said filter elements; and a quick acting valve disposed in said conduit.

2. Apparatus as recited in claim 1 wherein said filter elements comprises a plurality of porous hollow tubular elements open at a first end thereof to said dirty gas inlet, and open at a second end thereof to said removed particle outlet, the periphery thereof in operative association with said clean gas outlet.

3. Apparatus as recited in claim 1 wherein said filter elements comprise a plurality of parallel elongated hollow tubular elements open at one end thereof to said clean gas outlet, and closed at the other end thereof, said dirty gas inlet and particle outlet adjacent said closed end thereof.

4. Apparatus as recited in claim 3 wherein said vessel is vertically oriented, having a top, bottom, and side, and wherein said particle outlet is at the bottom of said vessel, said dirty gas inlet is in a side wall of said vessel above said bottom, but adjacent thereto; said conduit enters the top of said vessel; and said clean gas outlet is from a side wall of said vessel adjacent said conduit.

5. Apparatus as recited in claim 2 wherein said vessel is vertically oriented, having a top, bottom, and side, and wherein said particulate outlet is in the bottom thereof, said dirty gas inlet is near the top thereof, and said clean gas outlet is between the dirty gas inlet and particle outlet; wherein said elongated hollow tubular elements are vertically disposed; and wherein said conduit enters a side of said vessel between said dirty gas inlet and particle outlet.

6. Apparatus as recited in claim 5 wherein the clean side of said elongated hollow tubular element is divided into a plurality of horizontal chambers, one of said means (c) operatively associated with each of said horizontal chambers.

7. Apparatus as recited in claim 6 wherein a common source is provided for said means (c) associated with said horizontal chambers.

8. Apparatus as recited in claim 1 wherein said means (c) comprises at least two reservoirs, flow rate restrictor means, conduits, and quick acting valves associated with said clean side of said filter elements, said reservoirs being of different volume.

9. Apparatus as recited in claim 1 wherein said valve comprises a solenoid operated valve.

10. Apparatus as recited in claim 1 wherein said filter elements comprise a plurality of elongated hollow porous tubular elements open at at least one end thereof, the porous walls thereof in operative communication with said dirty gas inlet at one side thereof, and said clean gas outlet at the other side thereof.

11. Apparatus for separating particulate material from a high temperature gas containing material, comprising:
   a generally upright vessel having a top, bottom, and sides, and including a separate separated particulate outlet from the bottom thereof, a dirty gas inlet in the side thereof, and a clean gas outlet from a side thereof;
   a plurality of elongated hollow porous walled tubular elements disposed generally vertically within said vessel and open at at least one end thereof, the porous walls of said elements forming an inner surface and an outer surface, said inner surface in operative association with one of said dirty gas inlet or said clean gas outlet, and said outer surface in operative association with the other of said dirty gas inlet or said clean gas outlet, so that one side of said porous walls comprises a clean side, and the other side a dirty side;
   a source of high pressure cleansing gas adapted to pass through said porous walls to dislodge particles on the dirty side thereof;
   a reservoir operatively connected to said source of high pressure gas;
   flow rate restrictor means between said reservoir and said source for allowing only controlled flow of gas from said source to said reservoir;
   a conduit connected from said reservoir to a side of said vessel;
   a quick acting valve disposed in said conduit; and
   said reservoir having a volume sufficient to provide enough cleansing gas for effective cleaning of said tubular elements, but insufficient to cause thermal shock thereto.

12. Apparatus as recited in claim 11 wherein said clean side is divided into a plurality of horizontal chambers, and further comprising a reservoir, conduit, and quick acting valve, and flow rate restricting means associated with each horizontal chamber.

13. Apparatus as recited in claim 11 further comprising a plurality of reservoirs, flow rate restricting means, valves, and conduits, and valves associated with said clean side, each of said reservoirs having a different volume than the others.

14. A method of effectively separating particulate material from a high temperature gas utilizing a plurality of filter elements having one side thereof adapted to contact dirty, particulate containing, high temperature gas, and the other side thereof adapted to provide clean gas, said method comprising the steps of:
   (a) feeding dirty gas into contact with the dirty side of said filter element;
   (b) withdrawing clean gas from the clean side of said filter element;
   (c) periodically supplying a high pressure pulse of cleansing gas to the clean side of said filter elements to dislodge particles which have adhered to the dirty side of said filter elements, the cleansing gas having a lower temperature than the high temperature gas from which particulates are being separated; and
   (d) positively controlling the volume of the cleansing gas pulse in step (c) to minimize thermal shock to the filtering elements and to minimize interruption of the filtering action effected when previously dirty gas passes through the filter elements; and
   wherein step (d) is practiced by providing a high pressure source of cleansing gas; providing a reservoir of a controlled volume, for the cleansing gas; and restricting the passage of cleansing gas between the source and the reservoir; and wherein steps (c) and (d) are practiced by placing the reservoir in operative communication with the clean side of the filter elements to effect cleansing action.

15. A method as recited in claim 14 wherein said restricting step is practiced so as to allow sufficient cleansing gas to pass from said source to said reservoir to fill the reservoir with high pressure cleansing gas between the periods of practicing step (c), but preventing sufficient flow of gas from the source to the reservoir so that thermal shock to said filter elements occurs.

16. A method as recited in claim 14 wherein step (c) is practiced by operating a quick acting valve.

17. A method as recited in claim 14 wherein a plurality of different sized reservoirs are provided, and wherein step (d) is practiced by selecting the reservoir having the size that is optimum for the temperature, gas, and other operative conditions, and supplying the gas from that reservoir in the practice of step (c).

18. A method as recited in claim 14 wherein the filtering elements are elongated porous walled tubes having one end open, and one end closed and wherein step (a) is practiced by directing dirty gas to the outer side of said filter elements.

19. A method as recited in claim 14 wherein said filter elements comprise a plurality of elongated porous walled tubular elements open at both ends thereof, and wherein step (a) is practiced by causing the dirty gas to pass through the interiors of the hollow filter elements, and wherein step (b) is practiced from exteriorly of the porous walls of the tubular elements.

20. A method as recited in claim 14 wherein step (c) is practiced by a pulse of cleansing gas that travels at approximately sonic velocity.

21. A method as recited in claim 14 wherein steps (c) and (d) are practiced so that the pulsed high pressure flow of cleansing gas will be effective only until the pressure in the reservoir is nearly twice the filtered clean gas side pressure.

22. A circulating fluidized bed reactor, comprising:
   means defining an upright reactor chamber having at least one gas discharge opening adjacent its upper end and at least one inlet opening for solids separated from the gas adjacent lower end;
   a filter housing;
   means defining a plurality generally vertically extending horizontally spaced passageways, said passageway defining means part formed of porous material and disposed in said filter housing;
   said filter housing and said reactor chamber being arranged back-to-back one with the other;
   said housing having a gas inlet in communication with said gas discharge opening and said passageways, a solids outlet in communication with said solids inlet opening, at least on one clean gas outlet;
   means in said housing in communication with said one clean gas outlet for communicating gas flowing through the porous material of said passageway defining means with said one clean gas outlet; and
   a source of high pressure cleansing gas; a reservoir of high pressure cleansing gas; restricting means connected between said source and said reservoir to allow very restricted passage of gas from said source to said reservoir; a conduit extending from said reservoir to said filter housing in operative association with said clean gas outlet; and a quick acting valve disposed in said conduit; so that upon operation of said valve the volume of said reservoir of high pressure cleansing gas is pulsed from said reservoir into operative association with said porous material, but wherein a pulsed high pressure flow will be effective only until the pressure in the reservoir is nearly twice the filter clean gas side pressure.

* * * * *